United States Patent [19]

Inbar

[11] 4,455,616

[45] Jun. 19, 1984

[54] FAST GAMMA CAMERA

[75] Inventor: Dan Inbar, Haifa, Israel

[73] Assignee: Elscint, Ltd., Haifa, Israel

[21] Appl. No.: 322,441

[22] Filed: Nov. 18, 1981

Related U.S. Application Data

[63] Continuation of Ser. No. 55,806, Jul. 9, 1979, abandoned.

[51] Int. Cl.³ .............................................. G01J 1/20
[52] U.S. Cl. ................................. 364/527; 250/363 S; 250/369; 364/571
[58] Field of Search ....................... 364/527, 555, 571; 250/363 S, 366, 369, 370

[56] References Cited

U.S. PATENT DOCUMENTS

| | | | |
|---|---|---|---|
| 3,878,373 | 4/1975 | Blum | 364/571 |
| 3,914,611 | 10/1975 | Stout | 250/369 |
| 3,919,556 | 11/1975 | Berninger | 250/363 S |
| 4,051,373 | 9/1977 | Hatch | 250/369 |
| 4,060,730 | 11/1977 | Zioni et al. | 250/369 |
| 4,071,762 | 1/1978 | Lange et al. | 250/369 |
| 4,186,307 | 1/1980 | Tanaka et al. | 250/363 S |

OTHER PUBLICATIONS

Tanaka et al., "Variable Sampling-Time Technique for Improving Count Rate Performance of Scintillation Detectors", *Nucl. Instr. and Methods*, #158, pp. 454-466, (1979).

*Primary Examiner*—Errol A. Krass
*Attorney, Agent, or Firm*—Sandler & Greenblum

[57] ABSTRACT

A gamma camera has a scintillation medium responsive to radiation stimuli for producing an exponentially decaying scintillation at a location where a radiation stimulus interacts with the medium; a photodetector system responsive to a scintillation for producing outputs; and computation circuitry responsive to such outputs for producing intrinsic signals which have the same temporal nature as a scintillation and which are processed to produce coordinate signals representative of the coordinates of the scintillation producing such outputs. The computation circuitry includes truncation circuitry for electronically shortening the duration of intrinsic signals so that the computation circuitry effectively operates with signals of shorter duration than the scintillations.

16 Claims, 5 Drawing Figures

FAST GAMMA CAMERA

This is a continuation application of application Ser. No. 055,806, filed July 9, 1979.

BACKGROUND OF THE INVENTION

This invention relates to gamma cameras, and more particularly to a gamma camera capable of producing reasonable images of dynamic body functions.

Conventional gamma cameras of the type disclosed in Anger U.S. Pat. No. 3,011,057 typically operate at count rates of about 100,000 counts per second. Using radioisotopes producing a flux with this count rate, the frame time sufficient to accumulate data to construct an image is of such duration that only limited dynamic processes can be investigated. In other words, a highly dynamic function such as regional cerebral blood flow would require a relatively short-lived isotope producing a relatively high flux of radiation of about 500,000 counts per second; and such a function cannot be imaged with a conventional gamma camera. While multi-crystal gamma cameras are known with the potential for imaging highly dynamic processes, such a camera, by reason of its multiplicity of crystals, is not only extremely complex and hence more expensive to build, operate and maintain than the relatively simple single crystal Anger type gamma camera, but has reduced resolution.

At the present time, the upper limit on the counting rate is about 200,000 counts per second which produces a 1.5 usec dead time, i.e., the time following a scintillation in the crystal during which the camera is blocked and prevented from processing a subsequent event. Such dead time has two components: the decay time of a scintillation that results when a radiation stimulus interacts with the crystal of the camera, and the computation or recovery time of the electronics associated with the computation circuitry by which signals representing the coordinates of a scintillation are computed. As to the event itself, it is approximated by the relationship (I) exp $(-t/\tau)$, where I is the amplitude of the pulse, t is time and $\tau$ is the time constant associated with the crystal. For a conventional sodium iodide thallium-activated crystal, the time constant is about 220 nsec which means that about one $\mu$sec (i.e., about five time constants) is required to collect 99 percent of the light produced by an event.

In the usual gamma camera, computation begins after the termination of the scintillation or the scintillation with the result that no event occurring during the relatively long period comprehending the decay time of the scintillation and computation can be accepted by the camera. Where two events occur sequentially within a time less than the order of about $5\tau$ the resulting "pile-up", if not compensated for, will produce erroneous results that further degrade image quality.

It is therefore an object of the present invention to provide a new and improved gamma camera in which dead time is significantly reduced as compared to the prior art while still enabling images of acceptable quality to be produced for high count rate imaging.

SUMMARY OF THE INVENTION

In accordance with the present invention, there is provided a gamma camera having a scintillation medium responsive to radiation stimuli for producing an exponentially decaying scintillation at a location where a radiation stimulus interacts with the crystal; a photodetector system responsive to a scintillation for producing outputs; and computation circuitry responsive to such outputs for producing intrinsic signals which have the same temporal nature as a scintillation and which are processed to produce coordinate signals representative of the coordinates of the scintillation producing such outputs. The computation circuitry includes truncation circuitry for electronically shortening the duration of intrinsic signals so that the computation circuitry effectively operates with signals of shorter duration than the scintillations.

The computation circuitry normally produces signals that are time-dependent in substantially the same manner as a scintillation, such signals being hereinafter termed intrinsic signals, and processes such signals to produce signals representative of the coordinates of the scintillation. Certain intrinsic signals are modified, prior to further processing by the computation circuitry, by returning the trailing end of an intrinsic signal to substantially the base line from which the intrinsic signal started after a period of time less than the duration of a scintillation, i.e., less than about $5\tau$ measured from the start of the intrinsic signal. The result is a truncated signal whose duration is shorter than that of the intrinsic signal so that the computational circuitry operates with pulses of a duration shorter than a scintillation thereby significantly reducing the dead time of the circuitry while still providing images of acceptable quality.

In the preferred form of the invention, the intrinsic signals on which an electronic shortening process is carried out are the coordinate and energy signals produced by a conventional gamma camera. This selection of intrinsic signals minimizes the number of electronic components as compared to the number required were the intrinsic signals those of the outputs of the individual photomultipliers. The preferred truncation circuitry is based on a delay line differentiation circuit which has a built-in attenuation feature, and is referred to below as an attenuated delay line differentiation circuit. The latter includes means for delaying an intrinsic signal by a predetermined period of time; means for attenuating the delayed signal by a factor functionally related to the time delay and to the nature of the known temporal characteristics of the intrinsic signal; and amplifier means for subtracting the attenuated signal from the intrinsic signal to produce a truncated signal. The attenuated delay line differentiation circuit effectively recognizes the beginning of an intrinsic signal and based on that information and the knowledge of the temporal nature of the decay of the intrinsic signal, (i.e., exponential), artificially creates a signal, namely an attenuated signal that commences a pre-determined period of time measured from the start of the intrinsic signal. When the attenuated signal is subtracted from the intrinsic signal, the trailing end of the latter will be cancelled, with the result that the trailing end of the truncated signal is returned to the base line from which the leading end of the truncated signal is measured. Consequently, if the delay of the attenuated delay line differentiation circuit is set for the time constant of a scintillation, namely about 220 nsec, and the attenuation is 1/e, the camera will operate on pulses whose duration is 1/5 of the usual duration permitting counting rates as high as 500,000 or more counts per second to be accommodated by the camera.

Furthermore, the preferred truncation circuit can also be utilized for the purpose of providing a look-ahead feature that detects the occurrence of consecutive pulses spaced apart less than the duration of the truncated pulse, such occurrence being termed a pulse pile-up condition. This condition, if not detected, will degrade the quality of the image produced by the gamma camera. By providing an attenuated delay line differentiation circuit operating on so-called "Z" energy channel associated with a gamma camera, and setting the delay time of the attenuated delay line differentiation circuit for, say 50 nsec, when the attenuated delay line differentiation circuit associated with the coordinate signals is set for, say 220 nsec, the attenuated delay line differentiation circuit in the "Z" channel can operate as a pulse pile-up detector and will produce an output which will exceed a threshold when pulse pile-up occurs within a 50 nsec interval. When the threshold is exceeded, the pile-up detector will disable the computation circuitry for causing the camera to ignore the piled-up pulses.

BRIEF DESCRIPTION OF THE DRAWINGS

An embodiment of the present invention is shown in the accompanying drawing wherein.

DESCRIPTION OF THE PREFERRED EMBODIMENTS

Figure 1:
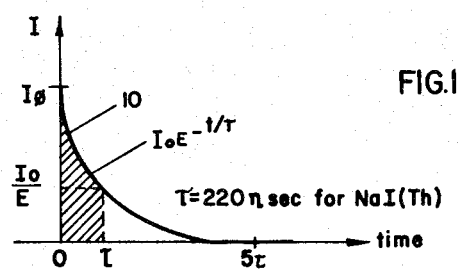
FIG. 1 is a time-diagram of an idealized scintillation showing the exponential nature of its decay.

Referring now to FIG. 1, reference numeral 10 designates the time variation of a light event or scintillation produced in a scintillation medium by the interaction between a radiation stimulus and the lattice structure of the medium. As seen in FIG. 1, the variation is in the form of an exponentially decaying pulse with a time constant $\tau$. The scintillation shown in FIG. 1 can be represented by the expression $I(t) \exp(-t/\tau)$, where $I(t)$ is the amplitude of the pulse which has statistical variations, t is time and $\tau$ is the time constant associated with the scintillation crystal. For a thallium-activated sodium iodide crystal, the time constant is about 220 nsec which means that in about one usec, which is equivalent to about five time constants, about 99% of the light produced by the event will have been emitted. In general, a gamma camera is designed to begin processing the outputs of the photomultipliers after about 99% or more of the light output from the scintillation is collected by the photocathodes of the photomultipliers. That is to say, processing begins about five time-constants following the scintillation. Within about one time constant of the initiation of a scintillation, about two thirds of the light will have been emitted and the amplitude of the light will have dropped by a value (1/e).

Figure 2:
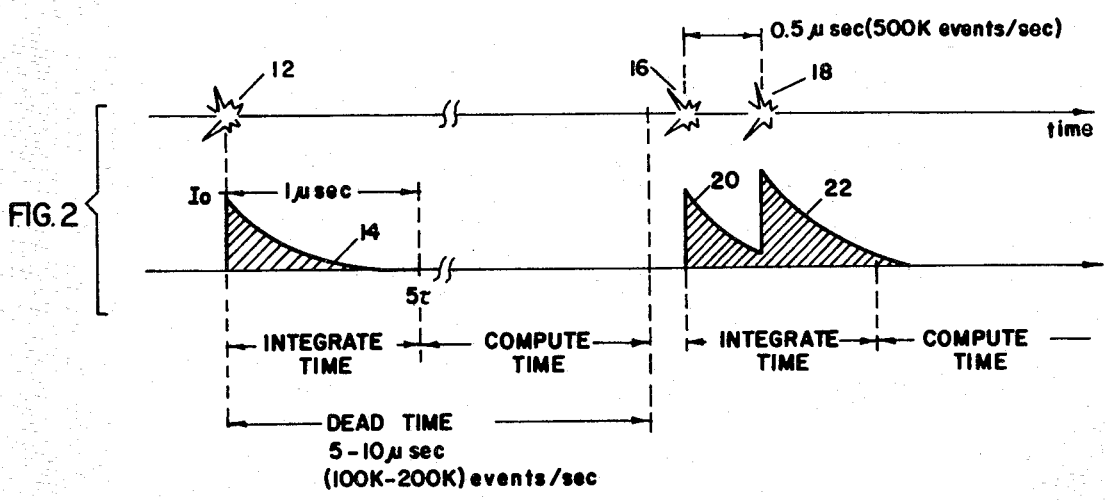
FIG. 2 is a time-diagram showing the relationship between sequential scintillations and the output of a photomultiplier of the gamma camera, and showing the effect of a pulse pile-up.

Referring now to FIG. 2, scintillation 12 produces scintillation pulse 14 which has the shape shown in FIG. 1. After about five time constants, 99% of the light produced by the event will have been emitted. As shown in FIG. 2, this is termed the "Integrate Time". Following the collection of the light, the computation circuitry of the gamma camera becomes effective to compute a signal representing the coordinates of the scintillation in a manner well known in the art. During the time the circuitry is computing, the gamma camera cannot accept for processing any further scintillation s. That is to say, a "dead time" exists depending on many factors dealing with the design of the computing circuitry. At the present time, it is conventional for gamma cameras to operate with a dead time of from 1–2 usec which is compatible with radioisotopes producing 100,000–200,000 events per second.

As shown in the right-hand portion of FIG. 2, a second scintillation that occurs within the decay time of the first scintillation will cause what is termed pulse pile-up which means that, even though two scintillations occur, they will be treated by the computation circuitry, unless provision is otherwise made, as a single scintillation. Under these circumstances this dual occurrence will cause errors in the image and will result in a degradation of the image quality. As can be seen in the right side of FIG. 2, the problem arises because the second scintillation sits on the tail of the first and appears to the camera as a single pulse having apparent coordinates that differ from the coordinates of the radiation field being mapped by the gamma camera.

The problem of pulse pile-up can be substantially reduced in accordance with the present invention because provision is made for electronically shortening the duration of the representation of scintillations so that the computation circuitry effectively operates with truncated signals containing almost all of the positional information, but which are shorter than the total decay time of the scintillation s. To illustrate how this is done, reference is made to FIG. 3 wherein a single scintillation crystal is designated by reference numeral 24 and one of the array of photomultipliers associated with the crystal is designated by reference numeral 26. The output of photomultiplier 26 is applied to pre-amplifier 28 in a conventional manner to provide a signal that is adequate to be operated on by the computing circuitry (not shown in FIG. 3) of the gamma camera.

The output of pre-amplifier 28 is an intrinsic signal applied to truncation circuit 30 which is preferably in the form of what is termed an attenuated delay line differentiation circuit 30 having a fixed delay at 32 for delaying the output of the pre-amplifier by a predetermined period of time. In the illustrated case, the time delay is $\tau$. In terms of a thallium-activated sodium iodide crystal, the time delay will be on the order of magnitude 220 nsec.

Figures 4, 5:
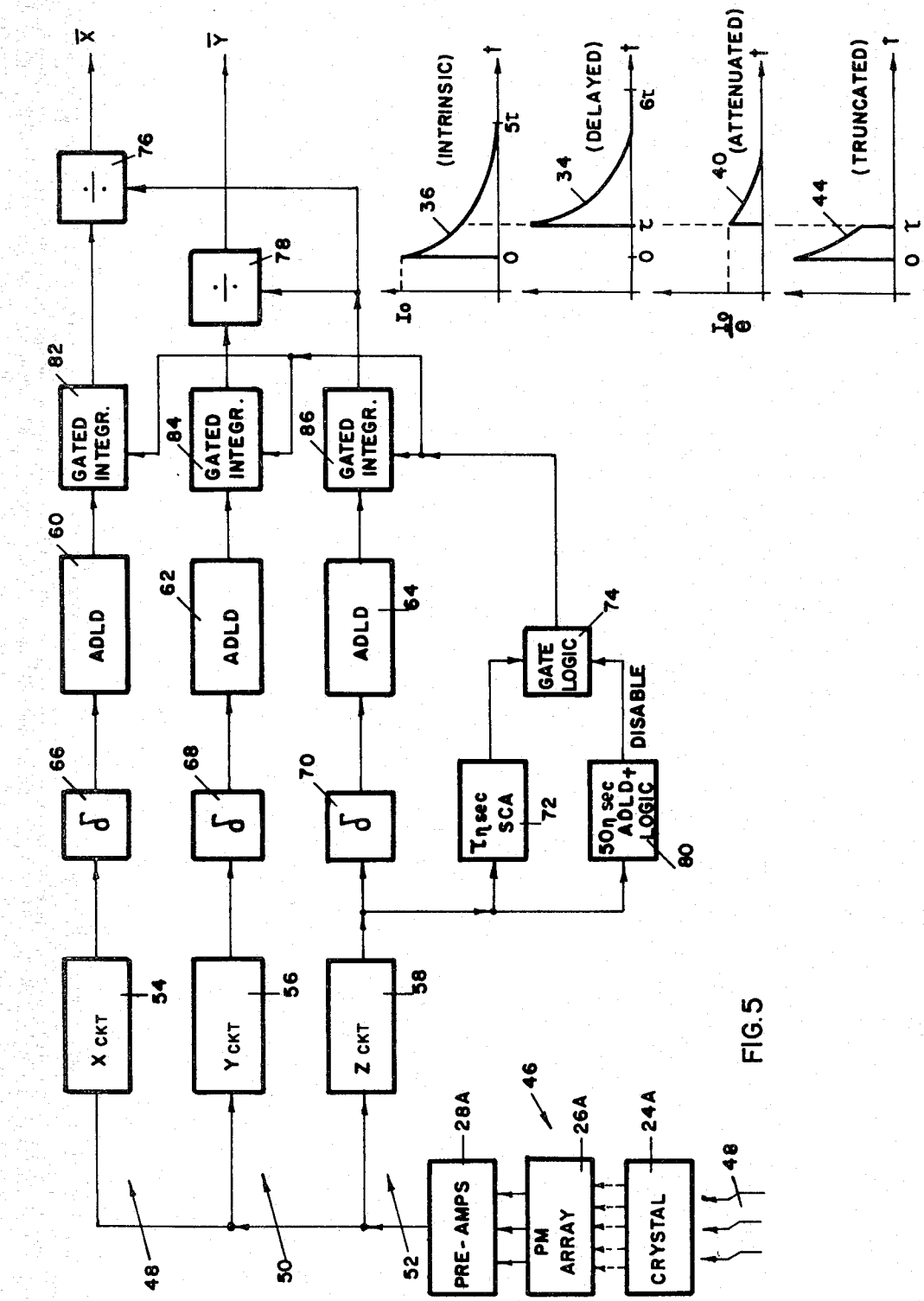
FIG. 4 is a time-diagram for comparing the waveforms at various locations in the circuit shown in FIG. 3.
FIG. 5 is a block diagram of the preferred form of the invention incorporated into a conventional gamma camera, and showing a pulse-pile-up detector associated with the gamma camera.

The delayed signal produced by circuit 32 is shown in curve 34 (FIG. 4) which is the same as curve 36 representing the output of the pre-amplifier, except that curve 34 is delayed in time by an amount $\tau$. The delayed signal produced by circuit 32 is attenuated in attenuator 38 by a factor functionally related to the predetermined period of time $\tau$, and the nature of the decay of pulse 36. In this particular case, since the pulse decays exponentially and the delay is one time constant, the amplitude of the curve 36 a time $\tau$ following the start of the pulse will decrease by the factor "e". Curve 40 shown at FIG. 4 represents the output of the attenuator which is an exponentially decreasing pulse having a peak amplitude of $I/e$ and a time constant $\tau$.

The attenuated signal 40 is subtracted from pulse 36 in amplifier subtractor 42 producing pulse 44 which can be described as a truncated signal whose leading portion is the same as the leading portion of pulse 36 and whose trailing portion is returned to substantially the base line from which the signal started prior to the time the intrinsic signal returns to its base line. The consequences of this arrangement are twofold: the rather long duration intrinsic pulse 36 has been replaced by a shorter duration truncated pulse, but approximately two thirds of the light produced by the scintillation would be available for use in calculating the coordinates of the scintillation. Because pulse 44 is substantially shorter in duration than pulse 36, a succeeding scintillation could occur one time constant subsequent to a leading scintillation but would not create a pile-up situation since the tail of pulse 36 has been removed by the attenuated delay line differentiation circuit.

Figure 3:
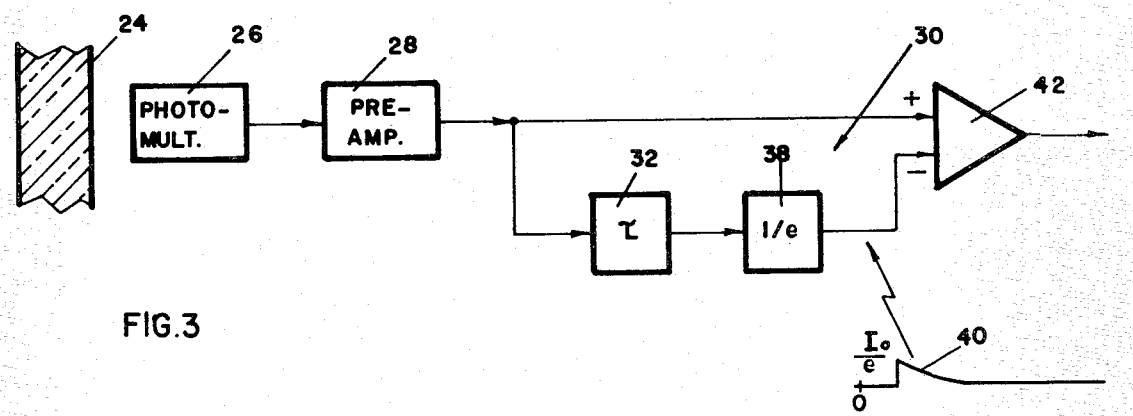
FIG. 3 is a block diagram of an attenuated delay line differentiation circuit which operates to truncate the output of a photomultiplier of the gamma camera.

In the approach taken in FIG. 3, a truncation circuit like that shown at 30 would be required for each of the 19 or more photomultipliers associated with the gamma camera. In order to reduce the circuitry required for truncation, it is preferred to use the arrangement shown in FIG. 5 to which reference is now made. In FIG. 5, the head of the gamma camera is indicated generally at 46 and comprises a scintillation crystal 24A which is responsive to radiation stimuli 48 for producing scintillations at locations where the stimuli interact with the crystal. Associated with the crystal is an array of photomultipliers indicated generally by reference character 26A, the photomultipliers being responsive to a scintillation for producing outputs having an exponential decay with a time constant $\tau$. Depending on the design used, a pre-amplifier will be associated with the photomultiplier and the array of pre-amplifiers is designated by reference character 28A. The outputs of the pre-amplifiers 28A are applied to a pair of coordinate computation channels 48, 50 and an energy determination channel 52.

In a conventional manner, well known in the prior art, coordinate computation means 54 in channel 48 is responsive to the output of the pre-amplifiers for computing a coordinate signal which is representative of the x-coordinate of the scintillation producing the outputs from pre-amplifiers 28A. Coordinate computation means 56 in channel 50 operates in a similar manner for supplying a coordinate signal representative of the y-coordinate of the scintillation. The means 54 and 56 operate by weighting the various outputs of the photomultipliers in accordance with their spatial location relative to the cross-section of the crystal. These means are entirely conventional and form no part of the present invention.

In a manner well known in the prior art, energy determination channel 52 includes a summing circuit 58 that adds all of the outputs of the pre-amplifiers for the purpose of producing a total energy signal which is representative of the total energy produced by the scintillation.

The outputs of circuits 54, 56, and 58 are applied, individually, to truncation circuits 60, 62, and 64 (which are configured like circuit 30) through delay lines 66, 68, and 70. The delay of these delay lines is long enough to allow a single channel analyzer to determine whether the total energy of a scintillation lies within a pre-determined energy window. Accordingly, the energy detection channel also includes a single channel analyzer circuit 72 which is associated with an attenuated delay line differentiation circuit (not shown in detail) having a delay of say $\tau$ nsec. In consequence, circuit 72 will produce a validating signal $\tau$ nsec subsequent to a scintillation provided the total energy of the scintillation falls within a predetermined energy window. Thus the circuit 72 will provide an output, if the total energy of the scintillation corresponds to a direct radiation stimulus, in time for enabling gated integrators 82, 84, and 86 to process the truncated signals produced by truncation circuits 60, 62, and 64.

The outputs of the gated integrators are normalized by dividing the outputs by the total energy signal in dividers 76, 78. Thus, the output of divider 76 is a normalized signal representative of the coordinates of a scintillation whose energy falls within the predetermined energy window of the single channel analyzer of circuit 72. Similarly, the output of divider 78 is representative of the y-coordinate of a scintillation.

The energy determination channel 52 is also provided with look-ahead circuit 80 which functions as a pile-up detector. Circuit 80 includes an attenuated delay line differentiation circuit and additional logic for testing the output of this circuit, the delay of the attenuated delay line differentiation circuit being set for a relatively short period of time such as 50 nsec when the delay of the corresponding circuit associated with the single channel analyzer is set for say $\tau$ nsec. As a consequence, the output of the attenuated delay line differentiation circuit of block 80 will exceed a threshold when two scintillations occur separated in time by less than 50 nsec. Consequently, block 80 includes logic for determining the threshold and producing a disable signal which closes gate 74 in the event of a pulse pile-up condition. The closing of gate 74 prevents the enabling of gated integrators 82, 84, and 86 thus precluding the calculation of coordinates when a pile-up situation exists. This elimination of pulse pile-up situations in the computing process has the effect of improving the image quality of the gamma camera.

The present invention is also applicable to gamma cameras having a mosaic of scintillation crystals rather than a single unitary crystal. Furthermore, the use of photodetectors other than photomultipliers is also contemplated.

While the preferred truncation circuit disclosed is an attenuated delay line differentiation circuit because of its simplicity, other circuit arrangement can be utilized. For example, it is possible to utilize a function generator that will generate the inverse of the tails of the co-ordinate signals in channels 48 and 50 upon determining the existence of such signals and their maximum amplitudes. Alternatively, the entire process could be carried out digitally and the tails computed and subtracted from digital representations of the coordinate signals.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A gamma camera having: a scintillation medium responsive to radiation stimuli for producing an exponentially decaying scintillation at a location where a radiation stimulus interacts with the medium; a photodetector system responsive to a scintillation for producing outputs; and computation circuitry responsive to such outputs for producing intrinsic signals which vary with time in substantially the same manner as said outputs, the improvement comprising: means for modifying said intrinsic signals to produce corresponding truncated signals, the trailing end of each truncated signal being returned to substantially the baseline from which the last mentioned signal started after a period of time shorter than that required for the return of the trailing end of the intrinsic signal to which the truncated signal corresponds.

2. The improvement of claim 1 wherein the camera has a single crystal.

3. The improvement of claim 2 wherein the photodetector system is constituted by an array of photomultipliers.

4. The improvement of claim 1 wherein the truncated signals have a duration of about one time constant of the intrinsic signals.

5. A fast gamma camera comprising:
  (a) a scintillation medium responsive to radiation stimuli for producing scintillations at locations where the stimuli interact with the medium;
  (b) a photodetector system responsive to a scintillation for producing outputs having an exponential decay with a given time constant; and
  (c) computation circuitry responsive to such outputs for producing intrinsic signals which vary with time in substantially the same manner as said outputs;
  (d) said computation circuitry including means for modifying said intrinsic signals to produce corresponding truncated signals, the trailing end of each truncated signal being returned to substantially the baseline from which the last mentioned signal started after a period of time shorter than that required for the return of the trailing end of the intrinsic signal to which the truncated signal corresponds.

6. A fast gamma camera according to claim 5 wherein a single scintillation crystal covers the entire field of view of the camera.

7. A fast gamma camera according to claim 5 including a pair of coordinate computation channels whose respective output represent the x- and y-coordinates of an event whose energy level falls within a predetermined energy window; an energy detection channel whose output is representative of an event within a predetermined energy window, each coordinate computation circuitry having means for producing a coordinate signal in response to a scintillation, such coordinate signal varying with time in substantially the same manner as the output signals of the photomultipliers, and a truncating circuit responsive to a coordinate signal for producing a truncated signal whose leading portion is the same as the leading portion of the coordinate signal, and whose trailing portion is returned to substantially the base line from which the truncated signal started but before the trailing portion of the coordinate signal.

8. A fast gamma camera according to claim 7 wherein truncation occurs after a period of time less than about five time constants of the coordinate signal.

9. A fast gamma camera according to claim 8 wherein the truncation circuit is an attenuated delay line differentiation circuit.

10. A fast gamma camera according to claim 9 wherein the attenuated delay line differentiation circuit includes means for delaying the coordinate signal by a predetermined period of time, means for attenuating the delayed signal by a factor functionally related to the predetermined period of time, and amplifier means for subtracting the attenuated signal from the coordinate signal to produce the truncated signal.

11. A fast gamma camera according to claim 10 wherein the energy detecting circuit includes a single channel analyzer with an attenuated delay line differentiation circuit having a delay time of less than five $\tau$ for producing a validating signal when the energy of a scintillation is within a predetermined energy window, and each computation channel includes delay means for delaying the output of the coordinate computation means before the output is applied to the truncation circuit, such delay being no less than the delay time of the attenuated delay line differentiation circuit of the single channel analyzer, and logic means responsive to a validating signal for enabling the amplifier means of the attenuated delay line differentiation circuit of the coordinate computation circuitry.

12. A fast gamma camera according to claim 11 wherein the energy detection channel includes a pile-up detector having an attenuated delay line differentiation circuit with a delay less than the delay time of the attenuated delay line differentiation circuit of the single channel analyzer.

13. A fast gamma camera according to claim 12 wherein the energy detection channel includes a detector having an attenuated delay line differentiation circuit with a delay less than the delay of the attenuated delay line differentiation circuit of the single channel analyzer, and a logic circuit responsive to the peak amplitude of the truncated output of the last-mentioned attenuated delay line differentiation circuit for producing a pile-up signal when the peak amplitude exceeds a threshold, indicative of sequential occurrence of scintillations within a period of time less than the delay time of the single channel analyzer.

14. A fast gamma camera according to claim 13 including means for blocking said validating signal from the single channel analyzer when the pile-up detector produces a pile-up signal.

15. A fast gamma camera according to claim 5 including:
  (a) an energy detecting circuit which includes a single channel analyzer with an attenuated delay line differentiation circuit having a delay time less than about five of said given time constants for producing a validating signal when the energy of a scintillation is within a predetermined energy window;
  (b) delay means for delaying the output of the computation circuitry before the output is applied to the truncation circuit, such delay being no less than the delay time of the attenuated delay line differentiation circuit of the single channel analyzer; and
  (c) logic means responsive to a validating signal for enabling the attenuated delay line differentiation circuit of the computation circuitry.

16. A fast gamma camera according to claim 15 wherein the energy detection channel includes a pile-up detector having an attenuated delay line differentiation circuit with a delay less than the delay time of the attenuated delay line differentiation circuit of the single channel analyzer.

* * * * *